No. 748,968. Patented January 5, 1904.

UNITED STATES PATENT OFFICE.

WILLIAM B. MEIXELL AND THOMAS HOLT, OF SAYRE, PENNSYLVANIA, ASSIGNORS, BY DIRECT AND MESNE ASSIGNMENTS, OF PART OF THEIR RIGHT TO SAMUEL THORP, OF ELMIRA, NEW YORK, AND HARRY L. TOWNER AND FRED K. STEPHENS, OF SAYRE, PENNSYLVANIA.

PROCESS OF MAKING PAPER FROM OLD NEWSPAPERS, BOOKS, MAGAZINES, &c.

SPECIFICATION forming part of Letters Patent No. 748,968, dated January 5, 1904.

Application filed August 28, 1903. Serial No. 171,159. (No specimens.)

*To all whom it may concern:*

Be it known that we, WILLIAM B. MEIXELL and THOMAS HOLT, citizens of the United States, residing at Sayre, in the county of Bradford and State of Pennsylvania, have invented new and useful Improvements in Processes for Making Paper from Old Newspapers, Books, Magazines, &c., of which the following is a specification.

This invention relates to the process of manufacturing paper suitable to be printed upon from old newspapers, books, magazines, and other printed matter of any kind by removing therefrom the ink and coloring-matter and finally making the pulp into a suitable paper.

In carrying out our invention we take the old paper which has been printed upon and gradually feed it into a beating-engine, in which it is beat in the usual manner. The water used in the beating process and the pulp is then heated, preferably to about 100° Fahrenheit, for the purpose of softening the pulp and loosening or liberating the inks and coloring-matter from the pulp. To this pulp is added the following compound in about the proportions hereinafter stated: ten parts of soda, nine parts of margaric acid, fifty-nine parts of oleic acid, and twenty-one parts of water. These ingredients are thoroughly mixed and are added to an absorbent earthy matter in about the proportion of one-third of the compound to two-thirds of the earthy matter, and these are thoroughly mixed by stirring. Water is then added to the resultant compound sufficient to bring the compound to about the consistency of cream.

The old newspapers or other printed matter having been reduced to a pulp in the beating-engine and heated, as before described, we add from about ten to fifteen gallons of the foregoing compound to a ton of the pulp, according to the amount of ink and coloring-matter in the paper. This compound destroys all of the ink and colors, leaving only the carbon, which is washed out of the pulp. The pulp is then ready and is preferably fed to a Jordan engine for grinding it, after which it is ready to be made into any desired kind of paper in the usual way.

The proportions hereinbefore stated may be varied without departing from the spirit and scope of our invention, and we do not desire to be limited to our precise process as hereinbefore described, as it may be slightly varied without destroying the essentials of our invention.

Having thus described our invention, what we claim, and desire to secure by Letters Patent, is—

1. The process of making paper from old newspapers, magazines, books, and other printed matter which consists in reducing the same to a pulp and then subjecting the pulp to a compound consisting of soda, margaric acid, oleic acid, water, and earthy matter, for the purpose of removing the ink and coloring-matter, and finally making the pulp into paper in the usual manner.

2. The process of making paper from old newspapers, magazines, books, and other printed matter which consists in reducing the same to a pulp, heating the pulp and subjecting the heated pulp to a compound consisting of soda, margaric acid, oleic acid, water and earthy matter for removing the ink and coloring-matter from the pulp and then forming the pulp into paper in the usual manner.

3. The process of making paper from old newspapers, magazines, books, and other printed matter, which consists in reducing the same to a pulp, heating the pulp, and subjecting the pulp while heated to a compound consisting of soda, margaric acid, oleic acid, water and earthy matter to remove the ink and coloring-matter, then washing from the pulp the carbon of the ink or coloring-matter and finally making the pulp into paper in the usual manner.

4. A compound for the purpose described, consisting of soda, margaric acid, oleic acid, earthy matter and water.

In testimony whereof we have hereunto set our hands in the presence of two subscribing witnesses.

WILLIAM B. MEIXELL.
THOMAS HOLT.

Witnesses:
SAML. THORP,
HARRY L. TOWNER.